(12) United States Patent
Heo et al.

(10) Patent No.: US 9,400,049 B2
(45) Date of Patent: Jul. 26, 2016

(54) SHIFTING APPARATUS AND METHOD FOR VEHICLE

(71) Applicant: SL Corporation, Daegu (KR)

(72) Inventors: Chun Nyung Heo, Gyeonsangbuk-Do (KR); Jeong Ho Bak, Daegu (KR)

(73) Assignee: SL Corporation, Daegu (KR)

( * ) Notice: Subject to any disclaimer, the term of this patent is extended or adjusted under 35 U.S.C. 154(b) by 52 days.

(21) Appl. No.: 14/079,175

(22) Filed: Nov. 13, 2013

(65) Prior Publication Data

US 2014/0149005 A1    May 29, 2014

(30) Foreign Application Priority Data

Nov. 26, 2012   (KR) .................... 10-2012-0134525

(51) Int. Cl.
```
F16H 59/08    (2006.01)
F16H 59/02    (2006.01)
F16H 59/10    (2006.01)
```
(52) U.S. Cl.
CPC ............ *F16H 59/08* (2013.01); *F16H 59/0204* (2013.01); *F16H 59/105* (2013.01); *F16H 2059/0295* (2013.01); *Y10T 74/2003* (2015.01)

(58) Field of Classification Search
None
See application file for complete search history.

(56) References Cited

U.S. PATENT DOCUMENTS

| | | | |
|---|---|---|---|
| 6,439,073 B2* | 8/2002 | Ohashi | F16H 59/0204 74/335 |
| 7,028,575 B2* | 4/2006 | Ehrmaier et al. | 74/473.12 |
| 7,107,868 B2 | 9/2006 | Yone | |
| 2005/0239596 A1* | 10/2005 | Giefer et al. | 74/473.12 |
| 2007/0144293 A1* | 6/2007 | Rettenmaier et al. | 74/473.18 |
| 2010/0300234 A1* | 12/2010 | Giefer | F16H 59/10 74/473.25 |
| 2013/0061706 A1* | 3/2013 | Wang | 74/473.15 |

FOREIGN PATENT DOCUMENTS

| | | | |
|---|---|---|---|
| JP | 2002-362178 A | 12/2002 | |
| JP | 2005-119466 A | 5/2005 | |
| JP | 2007-062664 A | 3/2007 | |

* cited by examiner

*Primary Examiner* — John R Olszewski
*Assistant Examiner* — David Merlino
(74) *Attorney, Agent, or Firm* — Mintz Levin Cohn Ferris Glovsky and Popeo, P.C.; Kongsik Kim; Carolina Säve

(57) ABSTRACT

A shifting apparatus and method for a vehicle is provided and the apparatus includes a transmission adjuster that shifts a gear position of an automatic transmission. In addition, a controller is configured to operate the transmission adjuster to shift the gear position of the automatic transmission to a neutral null position and the null position varies based on the gear position.

8 Claims, 9 Drawing Sheets

|       | N → P         | N → R         | N → D         |
|-------|---------------|---------------|---------------|
| P ○   | ●             | ○             | ○             |
| R ○   | ⊗     P ●     | ●     P ○     | ○     P ○     |
| N ●   | ○     R ○     | ⊗     R ●     | ○     R ○     |
| D/M ○ | ○     N ○     | ○     N ○     | ●     N ○     |
| ○     | ○   D/M ○     | ○   D/M ○     | ⊗   D/M ●     |

FIG. 3C

|   | R → P | R → N | R → D |
|---|---|---|---|
| P ○ | ◉ | ○ | ○ |
| R ◉ | ⊗ P ◉ | ○ P ○ | ○ P ○ |
| N ○ | ○ R ○ | ◉ R ○ | ○ R ○ |
| D/M ○ | ○ N ○ | ⊗ N ◉ | ◉ N ○ |
| ○ | ○ D/M ○ | ○ D/M ○ | ⊗ D/M ◉ |

FIG. 3D

|  | P → R | P → N | P → D |
|---|---|---|---|
| P ● | ○ | ○ | ○ |
| R ○ | ◐   P ○ | ○   P ○ | ○   P ○ |
| N ○ | ⊗   R ◐ | ◐   R ○ | ○   R ○ |
| D/M ○ | ○   N ○ | ⊗   N ◐ | ◐   N ○ |
| ○ | ○   D/M ○ | ○   D/M ○ | ⊗   D/M ◐ |

SHIFTING APPARATUS AND METHOD FOR VEHICLE

CROSS-REFERENCE TO RELATED APPLICATION

This application claims priority from Korean Patent Application No. 10-2012-0134525 filed on Nov. 26, 2012 in the Korean Intellectual Property Office, the disclosure of which is incorporated herein by reference in its entirety.

TECHNICAL FIELD

The present invention relates to a shifting apparatus and method for a vehicle, and more particularly, to a shifting apparatus and method for a vehicle that intuitively select a gear position of a vehicle transmission.

BACKGROUND ART

The application of cutting-edge technology to vehicles has improved the mobility and usefulness of vehicles. Thus, vehicles are becoming essential to modern society. A vehicle transmission may change gear ratios based on the speed of a vehicle to maintain the rotation of an engine constant. To shift gears based on driver intention, the transmission is configured to allow a driver to select a desired gear position by moving a shift lever along a gate pattern typically composed of Park (P), Reverse (R), Neutral (N), Drive (D), and Low (L).

While the shift lever can select a gear position, a shift from the selected gear position to an unselected gear position cannot currently be made. For example, in a typical P-R-N-D-L shift range displayed in a gate pattern, a shift from the P position to the D position can be made via the R position and the D position. However, since a conventional shifting apparatus only has one fixed null position, the shift lever cannot be returned to the null position. Therefore, for ease of a driver's gear-shifting operation, the transmission needs to shift gears without the input of a driver.

SUMMARY

The present invention provides a shifting apparatus and method for a vehicle, in which a plurality of null positions are formed (e.g., a variable null position is formed) to enable a driver to intuitively perform a gear-shifting operation. In addition, the present invention provides a shifting apparatus and method for a vehicle, in which a shift between gear positions may be made during a gear-shifting operation.

However, aspects of the present invention are not restricted to the one set forth herein. The above and other aspects of the present invention will become more apparent to one of ordinary skill in the art to which the present invention pertains by referencing the detailed description of the present invention given below.

According to an aspect of the present invention, a shifting apparatus for a vehicle may include: a transmission adjuster that shifts a gear position of an automatic transmission; and a controller configured to operate the transmission adjuster to shift the gear position of the automatic transmission to a neutral null position, wherein the null position varies based on the gear position.

According to another aspect of the present invention, a shifting apparatus for a vehicle may include: a shift lever that moves to select a gear position of an automatic transmission; an actuator that returns a position of the shift lever to a neutral null position; and a controller configured to operate the actuator based on the number of gear positions by which the shift lever has shifted.

According to another aspect of the present invention, a shifting method may include: shifting a gear position of an automatic transmission from a current gear position by a certain number of positions; and setting a null position to a position away from the current gear position by one position less than the certain number of positions.

BRIEF DESCRIPTION OF THE DRAWINGS

The above and other aspects and features of the present invention will become more apparent by describing in detail exemplary embodiments thereof with reference to the attached drawings, in which:

FIGS. 3A through 3D are exemplary diagrams illustrating a shift between gear positions of the shifting apparatus shown in FIG. 2 according to an exemplary embodiment of the present invention;

DETAILED DESCRIPTION

Figure 1:
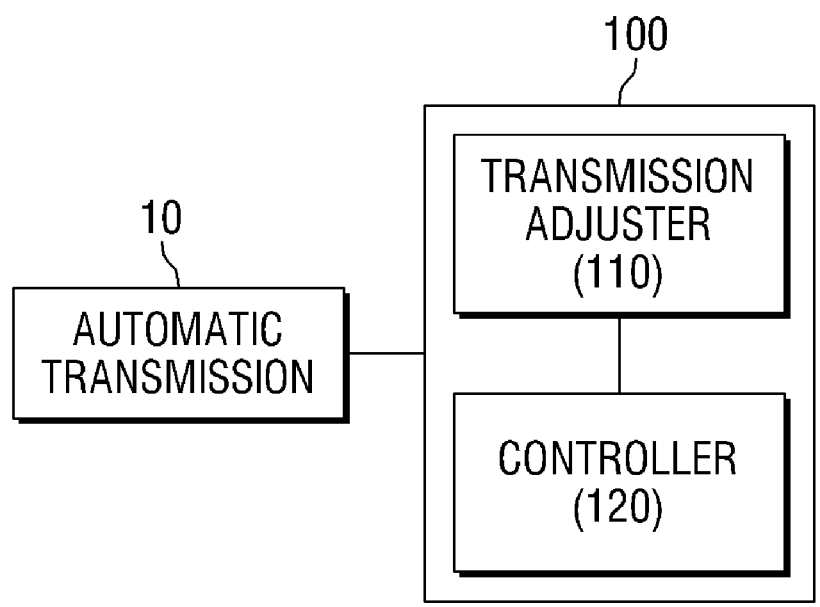
FIG. 1 is an exemplary block diagram of a shifting apparatus for a vehicle according to an exemplary embodiment of the present invention.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Advantages and features of the present invention and methods of accomplishing the same may be understood more readily by reference to the following detailed description of exemplary embodiments and the accompanying drawings. The present invention may, however, be embodied in many different forms and should not be construed as being limited to the exemplary embodiments set forth herein. Rather, these exemplary embodiments are provided so that this disclosure will be thorough and complete and will fully convey the concept of the invention to those skilled in the art, and the present invention will only be defined by the accompanying claims. Like reference numerals refer to like elements throughout the specification.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The present invention will now be described more fully with reference to the accompanying drawings, in which exemplary embodiments of the invention are shown.

FIG. 1 is an exemplary block diagram of a shifting apparatus 100 for a vehicle according to an exemplary embodiment of the present invention. Referring to FIG. 1, the shifting apparatus 100 may include a transmission adjuster 110 configured to adjust a gear position of an automatic transmission 10 and a controller 120 configured to operate the transmission adjuster 110 to shift the gear position of the automatic transmission 10 to a neutral null position.

In particular, the null position may vary according to the gear position and may be a home position of the gear position. Since the null position is variable, the home position of the gear position may also vary. For example, the null position when the gear position changes from a Park (P) position to a Drive (D) position may be different from the null position when the gear position changes from the P position to a Neutral (N) position. This will be described in detail later.

The transmission adjuster 110 may be configured to receive a shift signal and in response, may be configured to shift the gear position of the automatic transmission 10 by the number of positions indicated by the shift signal. In particular, the transmission adjuster 110 may be configured to shift the gear position of the automatic transmission 10 by three positions, two positions, or one position at a time. For example, in a shift range of P, R, N, and D arranged in this particular order, it may be possible to shift the gear position of the automatic transmission 10 by three positions from the P position to the D position through an overpress action. The overpress action refers to an external force that is applied when the gear position is shifted by one position, two positions, three positions, etc. When the gear position is shifted by an increased number of positions, the force of the overpress action may increase. Further, to sense this force of the overpress action, the shifting apparatus 100 may further include a sensor (not shown).

In addition, a tap-up or tap-down action may shift the gear position by one position, and the driver's overpress action may shift the gear position by two or more positions. For example, in the shift range of P, R, N and D arranged in this particular order, the gear position may be shifted from a Reverse (R) position to the P position by a tap-up action, from the R position to the N position by a tap-down action, and from the R position to the D position by an overpress action.

The controller 120 may be configured to operate the transmission adjuster 110 to set the null position to a position away from a current gear position by one position less than the number of positions indicated by the shift signal. In other words, when the transmission adjuster 110 shifts the gear position of the automatic transmission 10 by n positions from a current gear position, the controller 120 may be configured to operate the transmission adjuster 110 to set the null position to a position away from the current gear position by (n−1) positions, where n is a natural number. For example, when the transmission adjuster 110 shifts the gear position by three positions at a time, the controller 120 may be configured to operate the transmission adjuster 110 to set the null position to a position away from the current gear position by two positions. When the transmission adjuster 110 shifts the gear position by two positions at a time, the controller 120 may be configured to operate the transmission adjuster 110 to set the null position to a position away from the current gear position by one position. In addition, when the transmission adjuster 110 shifts the gear position by one position, the controller 120 may be configured to operate the transmission adjuster 110 to maintain the null position unchanged.

Specifically, when the transmission adjuster 110 shifts the gear position from the D position to the P position in the P-R-N-D shift range, the controller 120 may be configured to operate the transmission adjuster 110 to set the null position to a position returned at a time from immediately below the P position which is a target position of the gear-shifting action. Accordingly, the R position may become the null position as well as the home position. When the null position is maintained at the R position, the R position may become the P position. For example, the gear position may be shifted by one position by a tap-up/tap-down action and may be shifted by two or more positions through an overpress action. In particular, when the gear position is shifted by two positions or three positions, the null position may be set to a position away from a current gear position by one position or two positions. When the gear position is shifted by one position, the null position may remain unchanged.

Figure 2:
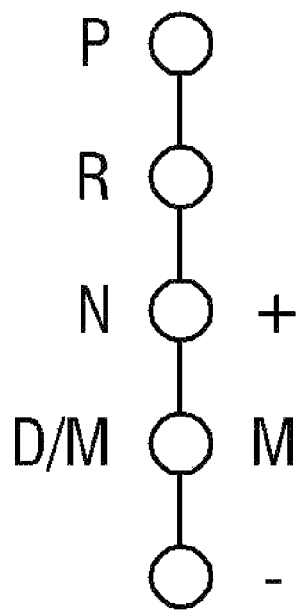
FIG. 2 is an exemplary diagram illustrating a shift range of the shifting apparatus shown in FIG. 1 according to an exemplary embodiment of the present invention.

A shifting process according to a shift range of the shifting apparatus 100 will now be described. FIG. 2 is an exemplary diagram illustrating an exemplary embodiment of the shift range of the shifting apparatus 100 shown in FIG. 1. Referring to FIG. 2, the shifting apparatus 100 may be configured to select one position from a shift range of P, R, N and D/M positions. A shift between the P, R, N and D/M positions may be made by more than one position at a time, and the null position may be set to a position returned at a time from a position immediately below a target position of one gear-shifting action. For the null position, a preliminary gear position may be prepared under the D/M position.

Specifically, the D/M position may be the D (Drive) position and a position in which a change from an automatic mode to a manual (M) mode may be made. It may also be possible to change from the automatic mode to the manual mode in other gear positions such as the P, R, and N positions. However, since the manual mode is a mode in which a driver adjusts the gear position, it may be desirable to make a mode change in the D position. In other words, the manual mode may be selected only in the D position. In addition, in the D/M position, a change between the automatic mode and the manual mode may be achieved by a substantially long tap action or by moving a shift lever to the right or left in a gate pattern through an overpress action.

Figure 3A:
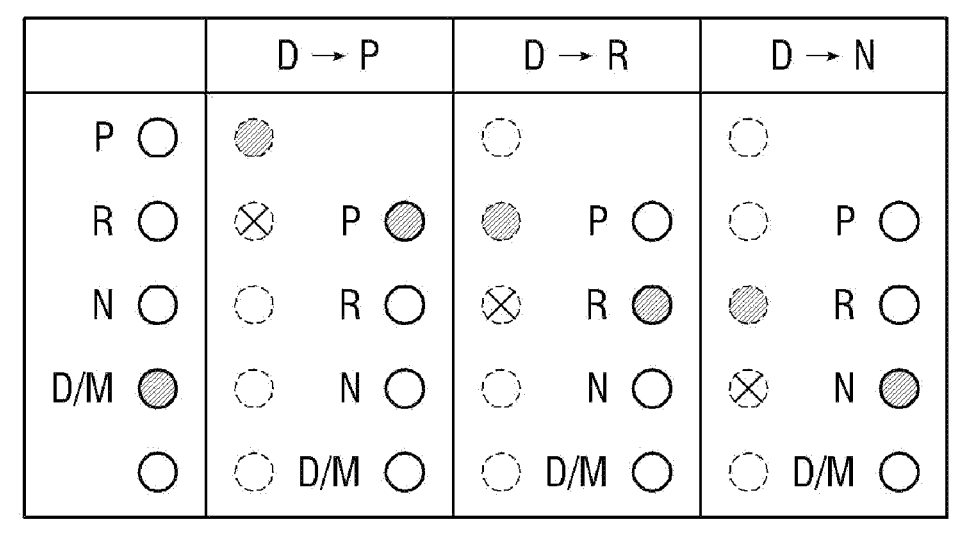
Figure 3B:
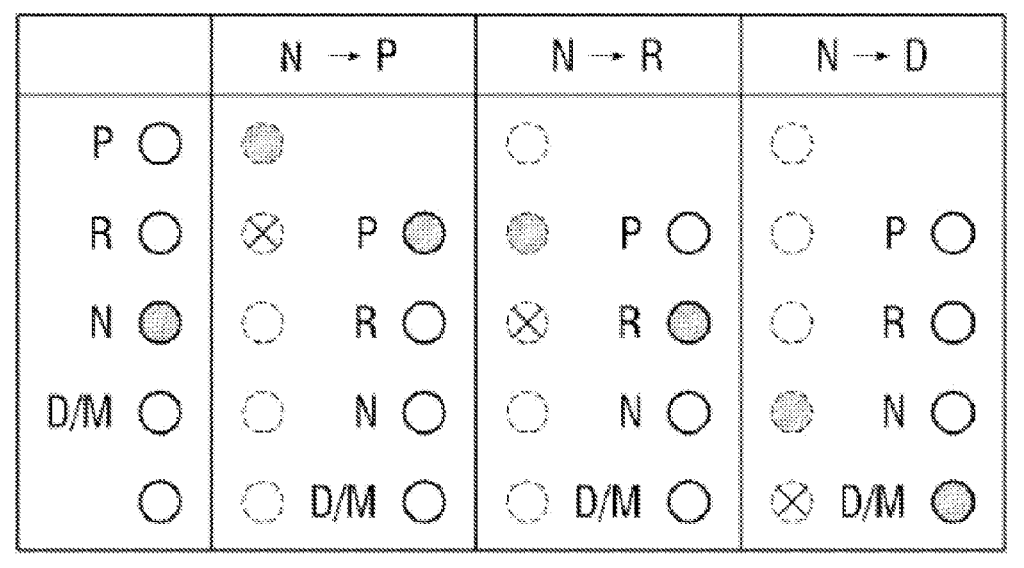

A process of setting the null position based on the gear position of the shifting apparatus 100 will now be described. FIGS. 3A through 3D are exemplary diagrams illustrating exemplary embodiments according to a shift between gear positions of the shifting apparatus 100 shown in FIG. 2. Referring to FIG. 3A, when shift position is in the D/M position, that is, in the D position, it may be possible to upshift by one position, two positions, or three positions.

For an upshift from the D position to the P position by three positions, the null position may be set to a position that is two positions up from the D position. Accordingly, the R position may become the null position. For an upshift from the D position to the R position by two positions, the null position may be set to a position that is one position up from the D position. Accordingly, the N position may become the null position. Additionally, for an upshift from the D position to the N position by one position, the null position may remain unchanged. Accordingly, the D/M position may remain the null position.

Referring to FIG. 3B, when the shift level is in the N position, it may be possible to upshift by one position or two positions and downshift by one position. In particular, for an upshift from the N position to the P position by two positions, the null position may be set to a position that is one position up from the N position. Accordingly, the R position may become the null position. For an upshift from the N position to the R position by one position, the null position may remain unchanged. Accordingly, the N position may remain the null position. Further, for a downshift from the N position to the D position, the null position may be set to a position that is two positions down from the N position, that is, a position immediately below the D/M position.

Figure 3C:
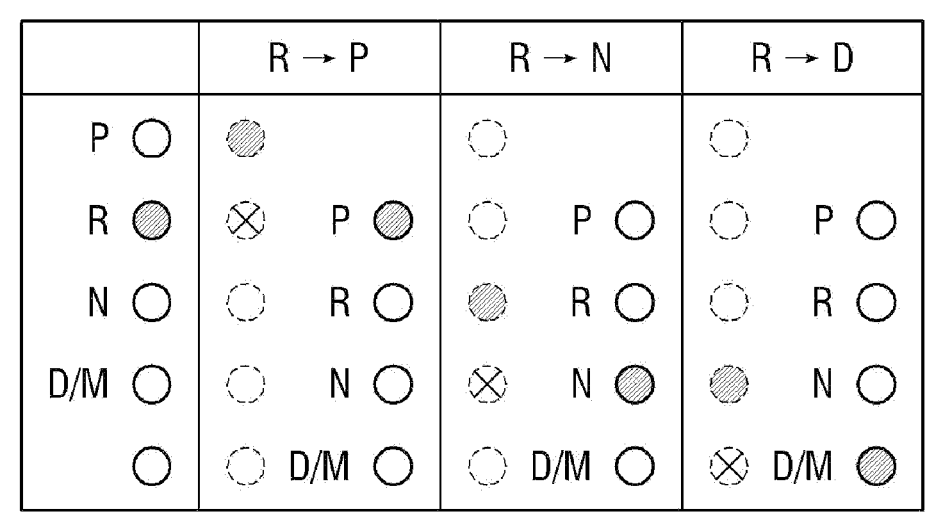

Referring to FIG. 3C, when the shift lever is in the R position, it may be possible to upshift by one position and downshift by one position or two positions. In particular, for an upshift from the R position to the P position by one position, the null position may remain unchanged. Accordingly, the R position may remain the null position. For a downshift from the R position to the N position by one position, the null position may be set to the D/M position that is two positions down from the R position. Accordingly, the D/M position may become the null position. Further, for a downshift from the R position to the D position by two positions, the null position may be set to a position that is three positions down from the R position, that is, a position immediately below the D/M position. Accordingly, the position immediately below the D/M position may become the null position.

Figure 3D:
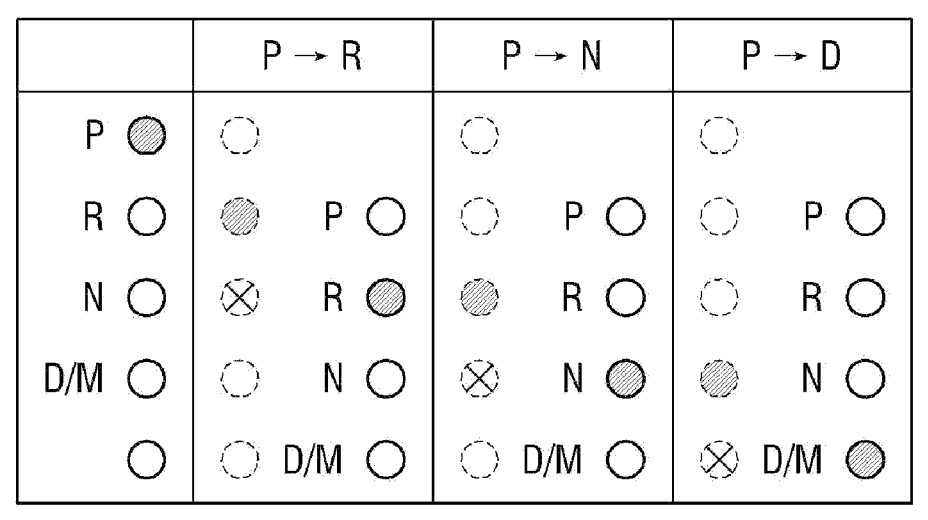

Referring to FIG. 3D, when the shift lever is in the P position, it may be possible to downshift by one position, two positions, or three positions. In particular, for a downshift from the P position to the R position by one position, the null position may be set to a position that is two positions down from the P position. Accordingly, the N position may become the null position. For a downshift from the P position to the N position by two positions, the null position may be set to a position that is three positions down from the P position. Accordingly, the D/M position may become the null position. Further, for a downshift from the P position to the D position by three positions, the null position may be set to a position that is four positions down from the P position, that is, a position immediately below the D/M position. Accordingly, the position immediately below the D/M position may become the null position.

Moreover, in any of the cases of FIGS. 3A through 3D, even when the null position varies, the order of the P, R, N and D/M positions may be maintained. In addition, it may be possible to select the manual mode in the D/M position.

Figure 4A:
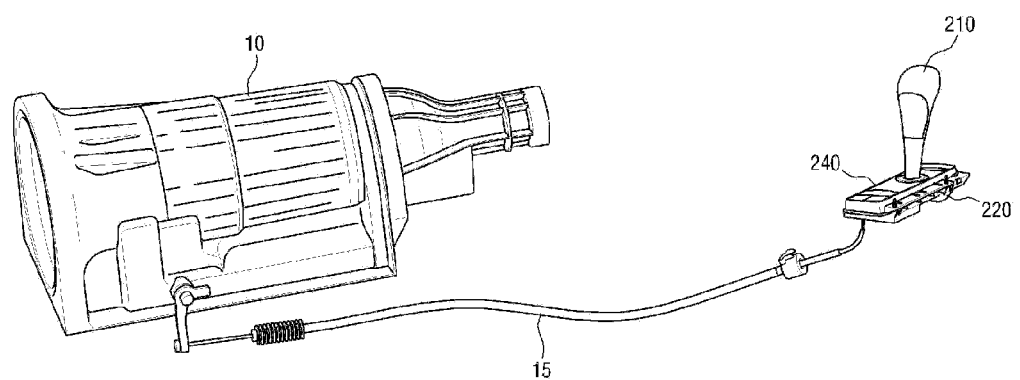
FIG. 4A is an exemplary view of a shifting apparatus for a vehicle according to another exemplary embodiment of the present invention.
Figure 4B:
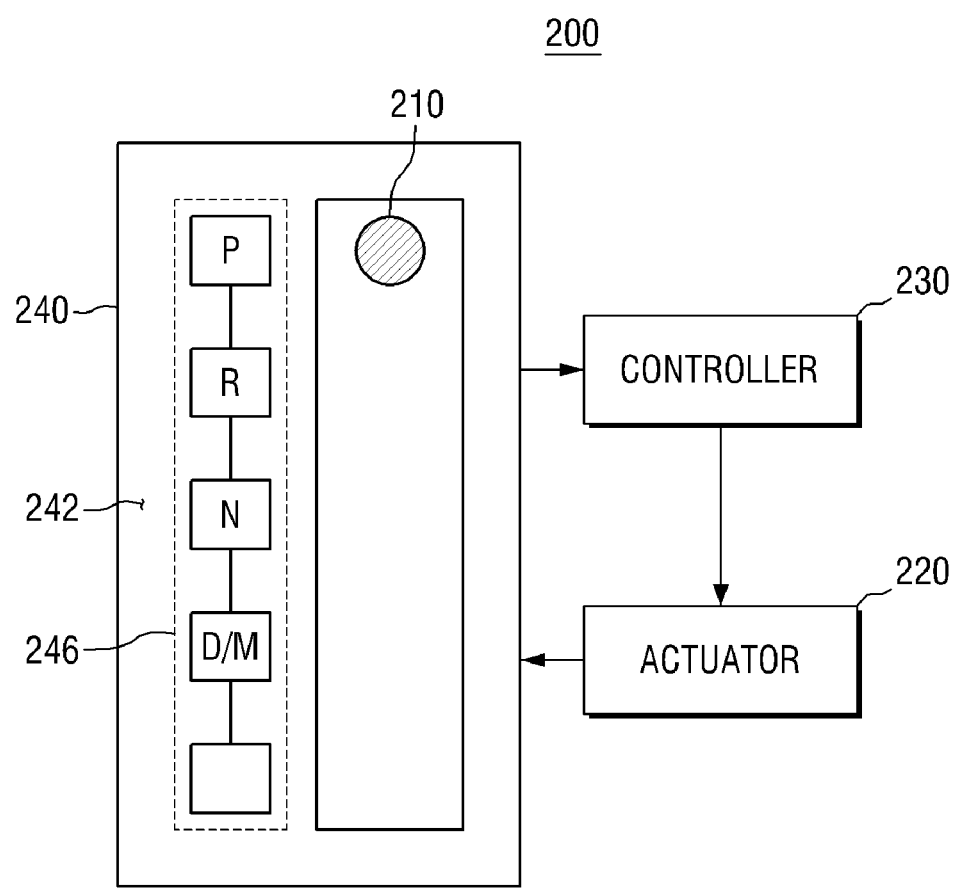
FIG. 4B is an exemplary block diagram of the shifting apparatus shown in FIG. 4A according to an exemplary embodiment of the present invention.

FIG. 4A is an exemplary view of a shifting apparatus 200 for a vehicle according to another exemplary embodiment of the present invention. FIG. 4B is an exemplary block diagram of the shifting apparatus 200 shown in FIG. 4A. Referring to FIGS. 4A and 4B, the shifting apparatus 200 may include a shift lever 210 that moves to select a gear position of an automatic transmission 10, an actuator 220 that returns the position of the shift lever 210 to a neutral null position, and a controller 230 configured to operate the actuator 220 based on the number of positions by which the shift lever 210 has been moved. The shifting apparatus 200 according to the exemplary embodiment may further include a gate unit 240.

The shift lever 210 may select gear positions in the order of P, R, N and D/M positions. The shift lever 210 may also select the more than one gear position at a time. For example, it may be possible, through an overpress action, to shift from the P position to the R position by one position at a time, from the P position to the N position by two positions at a time, or from the P position to the D/M position by three positions at a time. Alternatively, it may be possible to shift from the P position to the N position by two positions through an overpress action, from the P position to the D/M position by three positions through an overpress action, or from the P position to the R position by one position using a tap action. Alternatively, based on the number of tap actions, it may be possible to shift from the P position to the R position by one position, from the P position to the N position by two positions, or from the P position to the D/M position by three positions.

The actuator 220 may be operated by the controller 230 to provide a force that returns the shift lever 210, which has been moved by a driver to shift gears, to the null position. The null position to which the shift lever 210 returns may become a null gear, that is, the shift lever 210 may be placed in the null gear by the actuator 220.

The controller 230 may be configured to operate the actuator 220 to move the shift lever 210 to the null position based on the number of positions by which the shift lever 210 has moved from a current gear position. Specifically, the controller 230 may be configured to set the null position to a position away from the current gear position by one position less than the number of positions by which the shift lever 210 has moved. In other words, when the number of positions by which the shift lever 210 has moved from the current gear position is n, the null position may be set to a position away from the current gear position by (n−1) positions, and the position away from the current gear position by (n−1) positions may become the null position, where n is a natural number. For example, when the shift lever 210 moves three positions at a time from the current gear position, the null position may be set to a position away from the current gear position by two positions. When the shift lever 210 moves two positions at a time, the null position may be set to a position away from the current gear position by one position. When the shift lever 210 moves one position from the current gear position, the null position may remain unchanged.

The gate unit 240 may be where gear positions are selected sequentially by the movement of the shift lever 210. The gate unit 240 may include a range display 246 that displays a range of gear positions and a gate pattern 242 which may be a passage through which the shift lever 210 is moved to shift gears. In the gate unit 240, the shift range may be displayed in the order of the P, R, N and D/M positions. Accordingly, the P, R, N and D/M positions may be displayed in this order on the range display 246. However, the P, R, N and D/M positions may be arranged in other ways as is obvious to those of ordinary skill in the art. In the D/M position, a mode change from an automatic mode to a manual mode may be possible. Therefore, the gate unit 240 may further include a select space (not shown) from which the shift lever 210 may move to the right or left to change modes and to move up or down to select an up or down option in the manual mode.

In the shifting apparatus 200 according to the exemplary embodiment, the null position may vary based on a driver's gear-shifting action. Since this has been described above with reference to FIGS. 3A through 3D, a description thereof will be omitted.

Figure 5:
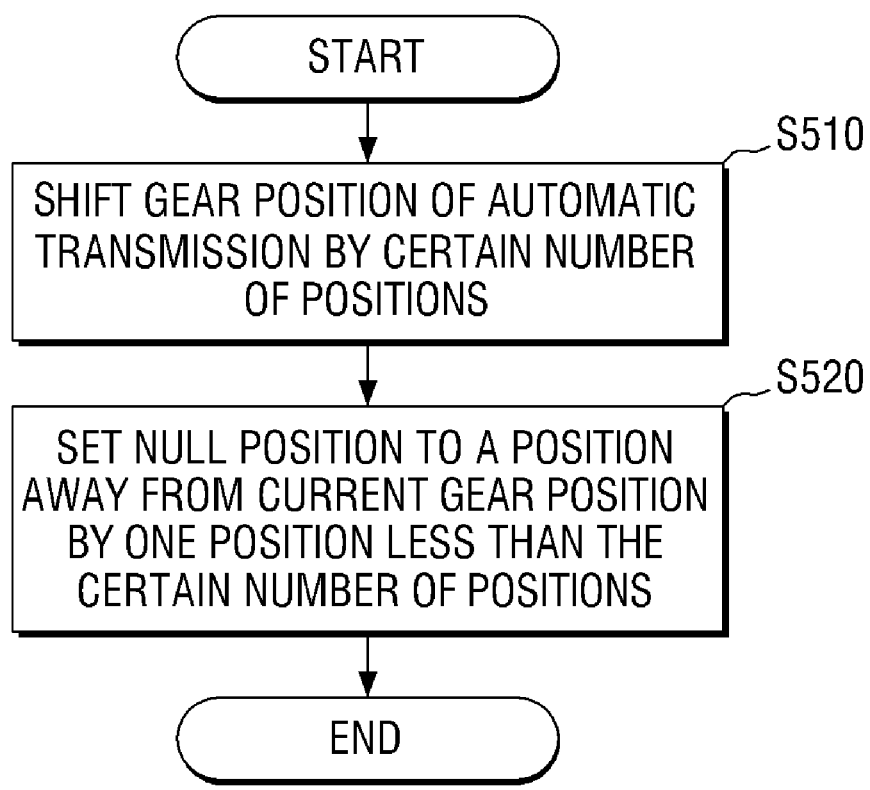
FIG. 5 is an exemplary flowchart illustrating a shifting method for a vehicle according to an exemplary embodiment of the present invention.

FIG. 5 is an exemplary flowchart illustrating a shifting method for a vehicle according to an exemplary embodiment of the present invention.

In the shifting method according to the current embodiment, when a gear position of an automatic transmission is shifted from a current gear position by a certain number of positions (operation S510), a null position may be set to a position away from the current gear position by one position less than the certain number of positions (operation S520). In other words, when the automatic transmission changes gears the null position may be determined to be a position immediately below a target position of the gear-shifting action. In addition, a plurality of null positions may be formed based on a change in the number of gear positions. That is, the null position may vary according to the gear position of the automatic transmission. For example, when the gear position of the automatic transmission is shifted from a current gear position by n positions, the null position may be set to a position away from the current gear position by (n−1) positions, where n is a natural number. In other words, the gear position may be shifted from the current gear position by three positions, two positions, or one position at a time, and the null position may be set to a position away from the current gear position by two positions or one position or may remain unchanged.

According to the present invention, a variable null position may be formed during a gear-shifting operation. Therefore, a driver may intuitively perform a gear-shifting operation. In addition, a shift between multiple gear positions may be made at one time during a gear-shifting operation.

While the present invention has been particularly shown and described with reference to exemplary embodiments thereof, it will be understood by those of ordinary skill in the art that various changes in form and detail may be made therein without departing from the spirit and scope of the present invention as defined by the following claims. The exemplary embodiments should be considered in a descriptive sense only and not for purposes of limitation.

What is claimed is:

1. A shifting apparatus for a vehicle, the shifting apparatus comprising:
a transmission adjuster that shifts an origin gear position of an automatic transmission to a destination gear position that is away from the origin gear position by n position or positions, where n is a natural number; and
a controller configured to operate the transmission adjuster to set a null position of the automatic transmission at a position away from the destination gear position by n−1 or n+1 position or positions,
wherein the null position varies according to the origin gear position and the destination gear position,
wherein the automatic transmission has a shift range including a Park (P) position, a Reverse (R) position, a Neutral (N) position, and a Drive (D) position,
wherein the P, R, N, and D positions are sequentially arranged, and
wherein:
(a) when the origin gear position is in the N position and it is shifted up to the P position by two (i.e., n=2) positions, the null position is set to the R position that is one (i.e., n−1) position up from the N position;
(b) when the origin gear position is in the N position and it is shifted up to the R position by one (i.e., n=1) position, the null position remains at the N position; and
(c) when the origin gear position is in the N position and it is shifted down to the D position by one (i.e., n=1) position, the null position is set to a position immediately below the D position that is two (i.e., n+1) positions down from the N position.

2. The shifting apparatus of claim 1, wherein the controller is configured to set the destination gear position to be placed in the null position.

3. The shifting apparatus of claim 1, wherein the P, R, N, and D positions are vertically arranged in this order, and wherein:
(a) when the origin gear position is in the R position and it is shifted up to the P position by one (i.e., n=1) position, the null position remains at the R position;
(b) when the origin gear position is in the R position and it is shifted down to the N position by one (i.e., n=1) position, the null position is set to the D position that is two (i.e., n+1) positions down from the R position; and
(c) when the origin gear position is in the R position and it is shifted down to the D position by two (i.e., n=2) positions, the null position is set to a position immediately below the D position that is three (i.e., n+1) positions down from the R position.

4. A shifting apparatus for a vehicle, the shifting apparatus comprising:
a shift lever configured to move to shift an origin gear position of an automatic transmission to a destination gear position that is away from the origin gear position by n position or positions, where n is a natural number;
an actuator configured to move the shift lever; and
a controller configured to set a null position of the automatic transmission at a position away from the destination gear position by n−1 or n+1 position or positions and to operate the actuator to move the shift lever to the null position,
wherein the null position varies according to the origin gear position and the destination gear position,
wherein the automatic transmission has a shift range including a Park (P) position, a Reverse (R) position, a Neutral (N) position, and a Drive (D) position,
wherein the P, R, N, and D positions are sequentially arranged, and
wherein:
(a) when the origin gear position is in the N position and it is shifted up to the P position by two (i.e., n=2) positions, the null position is set to the R position that is one (i.e., n−1) position up from the N position;

(b) when the origin gear position is in the N position and it is shifted up to the R position by one (i.e., n=1) position, the null position remains at the N position; and (c) when the origin gear position is in the N position and it is shifted down to the D position by one (i.e., n=1) position, the null position is set to a position immediately below the D position that is two (i.e., n+1) positions down from the N position.

5. The shifting apparatus of claim 4, wherein the automatic transmission shift range includes the Park (P) position, the Reverse (R) position, the Neutral (N) position, and a Drive (D)/Manual (M) position.

6. The shifting apparatus of claim 5, wherein the P, R, N, and D/M positions are sequentially arranged.

7. A shifting method for a vehicle, the shifting method comprising:

shifting, by a controller, an origin gear position of an automatic transmission to a destination gear position that is away from the origin gear position by n position or positions, where n is a natural number; and setting, by the controller, a null position of the automatic transmission at a position away from the destination gear position by n−1 or n+1 position or positions, wherein the null position varies according to the origin gear position and the destination gear position, wherein the automatic transmission has a shift range including a Park (P) position, a Reverse (R) position, a Neutral (N) position, and a Drive (D) position, wherein the P, R, N, and D positions are sequentially arranged, and wherein:

(a) when the origin gear position is in the N position and it is shifted up to the P position by two (i.e., n=2) positions, the null position is set to the R position that is one (i.e., n−1) position up from the N position;

(b) when the origin gear position is in the N position and it is shifted up to the R position by one (i.e., n=1) position, the null position remains at the N position; and (c) when the origin gear position is in the N position and it is shifted down to the D position by one (i.e., n=1) position, the null position is set to a position immediately below the D position that is two (i.e., n+1) positions down from the N position.

8. A non-transitory computer readable medium containing program instructions executed by a controller, the computer readable medium comprising:

program instructions that control a transmission adjuster to shift an origin gear position of an automatic transmission to a destination gear position that is away from the origin gear position by n position or positions, where n is a natural number, and program instructions that control the transmission adjuster to set a null position of the automatic transmission at a position away from the destination gear position by n−1 or n+1 position or positions wherein the null position varies according to the origin gear position and the destination gear position, wherein the automatic transmission has a shift range including a Park (P) position, a Reverse (R) position, a Neutral (N) position, and a Drive (D) position, wherein the P, R, N, and D positions are sequentially arranged, and wherein:

(a) when the origin gear position is in the N position and it is shifted up to the P position by two (i.e., n=2) positions, the null position is set to the R position that is one (i.e., n−1) position up from the N position;

(b) when the origin gear position is in the N position and it is shifted up to the R position by one (i.e., n=1) position, the null position remains at the N position; and (c) when the origin gear position is in the N position and it is shifted down to the D position by one (i.e., n=1) position, the null position is set to a position immediately below the D position that is two (i.e., n+1) positions down from the N position.

\* \* \* \* \*